United States Patent [19]

Hays

[11] 4,243,176
[45] Jan. 6, 1981

[54] SEALING AND AIR/FUEL MIXTURE FLOW METERING PLATE FOR GAS FURNACES

[75] Inventor: Herbert G. Hays, High Amana, Iowa

[73] Assignee: Amana Refrigeration, Inc., Amana, Iowa

[21] Appl. No.: 99,955

[22] Filed: Dec. 3, 1979

Related U.S. Application Data

[63] Continuation-in-part of Ser. No. 902,213, May 2, 1978, abandoned.

[51] Int. Cl.³ .............................................. F24H 3/08
[52] U.S. Cl. ...................................... 237/7; 239/396; 431/354
[58] Field of Search .................. 239/396; 431/354; 417/350; 237/8 R, 7

[56] References Cited

U.S. PATENT DOCUMENTS

| | | | |
|---|---|---|---|
| 2,585,290 | 2/1952 | Walker | 73/211 |
| 3,371,699 | 3/1968 | Riot | 431/354 X |
| 3,787,169 | 1/1974 | Gjerde | 431/354 X |
| 3,967,590 | 7/1976 | Hays et al. | 122/4 R |
| 3,997,109 | 12/1976 | Hays | 237/8 R |
| 4,045,159 | 8/1977 | Vishi et al. | 431/354 X |
| 4,151,745 | 5/1979 | Cordy et al. | 73/211 X |

Primary Examiner—Albert J. Makay
Assistant Examiner—William E. Tapolcai, Jr.
Attorney, Agent, or Firm—Robert W. Hoke II

[57] ABSTRACT

An orifice plate for metering a mixture of fuel and air to a blower for supply of the mixture to a burner positioned in a central plenum of a heat exchange system, the present plate further provides the sole sealing structure necessary for sealing conduit members which communicate the blower with a fuel regulator. The present orifice plate can be configured with apertures of differing size and number to facilitate field alternation of the heat capacity of the system and to allow rapid conversion of the system to alternate fuels without the need for removing and installing additional sealing structure. The ratio of fuel to air present in the mixture which is burned in the system is controlled by the size and/or number of apertures formed in the orifice plate.

10 Claims, 7 Drawing Figures

SEALING AND AIR/FUEL MIXTURE FLOW METERING PLATE FOR GAS FURNACES

CROSS-REFERENCE TO RELATED APPLICATION

This application is a continuation-in-part of U.S. patent application Ser. No. 902,213, filed May 2, 1978 by Herbert G. Hays, now abandoned.

BACKGROUND OF THE INVENTION

1. Field of the Invention

The invention generally relates to systems for burning natural gas such as are particularly used for heating residential structures. The invention particularly relates to apparatus for metering a mixture of fuel and air which is supplied to a burner of such a system, the apparatus also serving as the sole sealing structure necessary between a chamber in which the fuel and air are mixed and the atmosphere.

2. Description of the Prior Art

Compact heat exchange systems are known which economically extract heat from the products of combustion formed on burning of a mixture of fuel and air. Such systems typically comprise a burner positioned inside a plenum formed by a heat exchanger having heat exchange surfaces which contact the products of combustion. Such heat exchange systems are described in U.S. Pat. Nos. 3,967,590, issued July 6, 1976, and 3,997,109, issued Dec. 14, 1976. These highly efficient heating systems are adapted to residential housing needs and must be susceptible to easy and inexpensive servicing not only when repair is necessary but also when it is desired to alter the heating capacity of the system or to convert the system to operation with an alternate fuel. When such an alteration or conversion is to be made, such as to the system described in U.S. Pat. No. 3,967,590, it has been necessary to employ the services of trained service personel sice adjustments requiring exact training were required. Accordingly, a need is seen in the art to simplify the alteration of heat capacity or conversion to alternate fuels, thereby to facilitate servicing of presently available heating systems.

Riot, in U.S. Pat. No. 3,371,699, provides an industrial gas burner having a plate-like structural member which allows proportional mixing of fuel and air, the device so disclosed being intended to allow constant attention in an industrial process to the quantities of fuel and air which are ducted to a burner. However, the gas mixing structure disclosed by Riot serves only to meter gases into a mixing chamber and does not provide any sealing function within the gas ducting portion of the system. In the Riot structure, structure additional to the plate-like member is required to seal the system. Accordingly, the prior art does not provide a simple, easily serviced gas metering structure which can be readily replaced without the need to remove and replace sealing structure associated with the gas metering structure. The prior art gas metering structures are relatively difficult and expensive to service when compared with the gas metering structure disclosed herein, the present gas metering structure allowing rapid field alteration of heating capacity and fuel conversion within a matter of minutes.

SUMMARY OF THE INVENTION

The invention generally relates to package heating and cooling systems for residential use and more particularly to fuel, air and liquid metering and flow devices for a compact burner positioned in the central plenum of a compact, substantially cylindrical heat exchanger of such a system. In such systems, fuel is supplied to the burner through a blower, the blower drawing fuel from a pressure regulator which requires a somewhat less than atmospheric pressure at the blower inlet to activate the regulator and to allow fuel to flow from a supply line. Air for combustion enters the system between the pressure regulator and the blower through apertures in a series of plates positioned on the side of the blower. The invention particularly relates to this series of plates which function in combination to meter a desired quantity of air and fuel into the blower and also to seal the gas ducting structure between the regulator and the blower. An interior plate of the series of plates is removable from the system to allow replacement with a similar plate having fuel and air apertures of differing size and/or number, thereby to allow rapid conversion of the system to differing heat capacities and differing fuels. The entire system is thus rapidly adaptable by the removal and replacement of a single plate to allow the system to accommodate differing fuels, differing fuel flow rates, and differing fuel/air mixtures. These alterations and conversions are rapidly accomplished by service personel who need not devote the time or exercise the skill previously required for such a conversion.

The gas metering structure of the present invention particularly comprises a plate-like member having a series of apertures formed therein, at least one of the apertures functioning to meter fuel to the blower while at least one other aperture meters a desired quantity of air to the blower. The present structure can be referred to as an orifice plate, each orifice plate typically being provided with a single fuel metering aperture disposed centrally in the plate. The size of the fuel metering aperture can be varied from plate to plate to allow metering of a desired quantity (fuel metering pressure being constant) into the blower. Similarly, air metering apertures of varying sizes and/or number are disposed in the orifice plate, typically peripherally about the central fuel metering aperture, to allow a desired flow of combustion air into the blower. Orifice plates having varying fuel/air metering capacity can rapidly be inserted into the gas ducting portion of the heating system by orifice plate replacement. It is therefore possible to alter the heating capacity or convert the system to different fuels on site by the simple replacement of a single orifice plate. Since the present structure is configured to be self-sealing, such a conversion does not require the removal and replacement of associated sealing structure, the present orifice plate acting in concert with permanent associated structure to seal the gas metering portion of the system.

The environment of the present invention is seen to comprise package heating and cooling systems wherein fuel and air mixtures metered by the present invention are directed to a burner through a blower into which the present invention meters the fuel/air mixture. The blower is operated by a motor which also powers a solution pump to circulate liquid through a cylindrical heat exchanger. The circulating liquid picks up heat generated by the combustion of the fuel/air mixture and is pumped through a heat exchanger to transfer heat to air circulated from a living space, the air being returned to the living space at a higher temperature, thereby to heat the space. The products of combustion from the burner are forced radially outward from the burner through the cylindrical heat exchanger and into a surrounding wrapper for exhaust to the atmosphere. The compact units employing such heating systems also typically contain an air cooling system as a portion of the system.

It is therefore an object of the present invention to provide a fuel/air metering structure which supplies a mixture of fuel and air to a blower comprising a portion of a fuel burning heating system, the gas metering structure being readily and rapidly replaceable to allow alteration of the heating capacity of the system and conversion of the system to the use of differing fuels.

It is another object of the invention to provide a fuel/air metering structure comprising an orifice plate which meters desired quantities of air and fuel into a burner system, the orifice plate further acting to provide the sole sealing structure necessary for sealing conduit members which supply the fuel and air to the system.

It is a further object of the invention to provide orifice plates for gas metering structure wherein each orifice plate is configured with apertures of differing size and number to facilitate field alteration of the gas metering capability of a system within which the orifice plate is disposed.

It is a still further object of the invention to provide a fuel/air metering system for a burner wherein an apertured orifice plate functions to meter predetermined quantities of fuel and air to the burner, orifice plates constituting the gas metering structure being configured with apertures of differing size and number to facilitate on site alteration of heat capacity and conversion of the system to alternate fuels without the need for removing and installing additional sealing structure in the gas metering portion of the system.

It is yet another object of the invention to provide a single, dual-end motor elevated from the base of a cabinet which supplies an air/fuel mixture to a compact heat exchanger for combustion and simultaneously pumps a liquid heat exchange medium to the heat exchanger to accept a transfer of heat from the heat exchanger, the motor acting as an additional safety device to prevent fuel for combustion from being supplied to the burner.

Further objects and advantages of the invention will become apparent from the following detailed description of the preferred embodiments of the invention.

DESCRIPTION OF THE PREFERRED EMBODIMENTS

Figure 1:
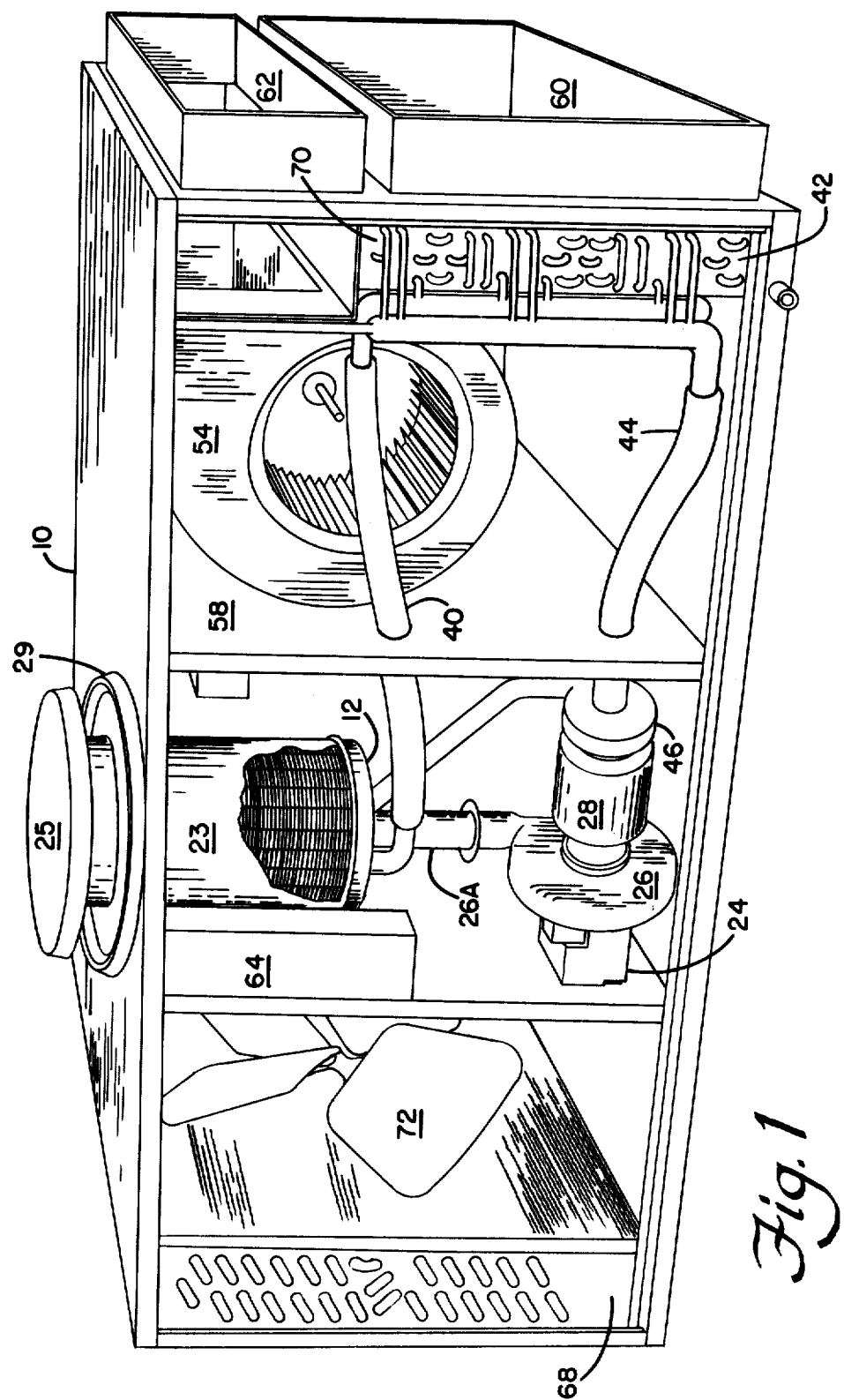
FIG. 1 is a perspective view, with portions broken away, of a heating and cooling system embodying this invention.
Figure 4:
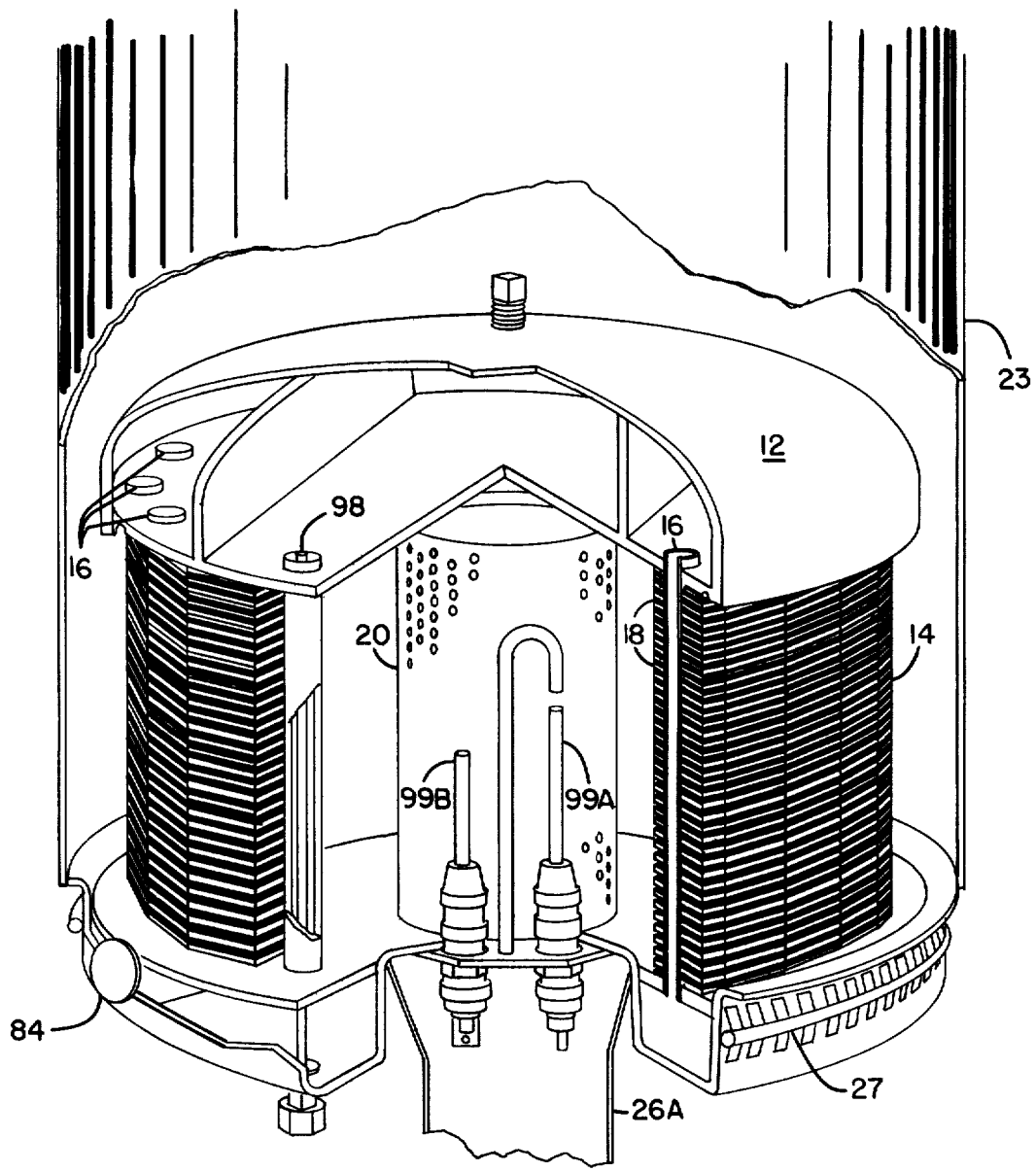
FIG. 4 is a perspective cutaway view of the heater unit illustrated in FIGS. 1 and 2.
Figure 5:
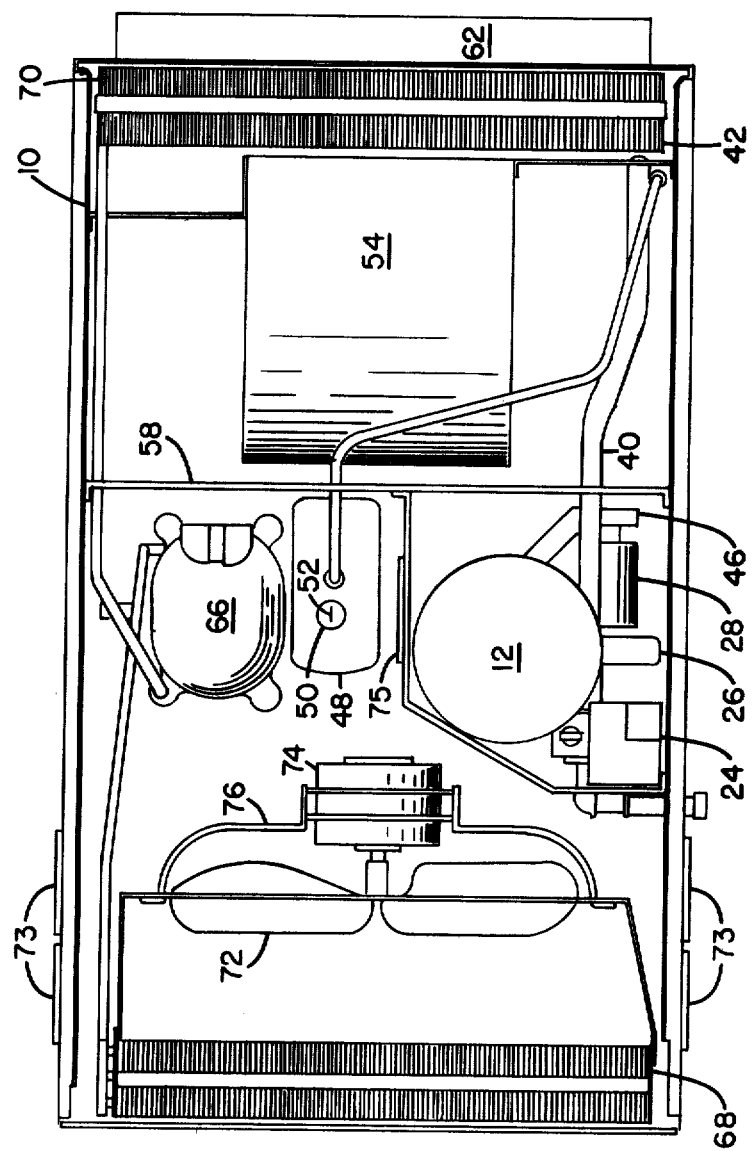
FIG. 5 is a top place view of the heating and cooling system illustrated in FIG. 1.

Referring now to FIGS. 1 and 5, there is shown a package unit 10 having base supporting sidewalls and a top which may be made of sheet metal removably attached to an angle iron frame as in conventional package heating units. Positioned at one side of the package 10 and approximately midway between the ends thereof is a compact heater unit 12. As illustrated in greater detail in FIGS. 2 and 4, heater 12 consists of a cylindrical matrix 14 comprising a plurality of tubes 16 through which is circulated liquid to be heated. Tubes 16 are enclosed in a plurality of fins 18 to form the unitary, thermally stable matrix 14 surrounding a central plenum. The fuel admixture enters heater 12 through intake 26a, passes through the burner screen 20 and is ignited by spark plug 99a. Flue gas, produced by the products of combustion from a burner 20 centrally located in the matrix plenum, is forced outwardly through the spaces between the fins 18 along radial heat exchange paths.

The escaping gases are deflected upwardly by a wrapper 23 and exhausted outwardly and downwardly through an insulated cap 25. Flange 29 redirects the escaping gases upwardly and away from the package 10. In this way, the package 10 is not unduly heated by the flue gases. Cap 25 is insulated with a suitable material such as fiberglass to reduce the heating effect caused by the escaping flue gases and to reduce the noise level of those escaping gases. Cap 25 and wrapper 23 serve the additional purpose of acting as a chimney for the system, eliminating the need for additional exhaust equipment.

Under these conditions large quantities of heat may be transferred from the burner 20 to the matrix. Liquid flowing through the tubes 16 extracts heat from the matrix to maintain all regions of the matrix below temperatures which would damage the matrix, for example, by melting the bonds between the fins and the tubes or by oxidizing the surface of the fins. More specifically, if said bonds are formed by brazing steel tubes and the fins with copper, all portions of the matrix brazing joints should be maintained below 900° F. Fuel is supplied to the heater 12 through a solenoid-controlled valve and a pressure regulator 24 whose output is gas at a pressure slightly below atmospheric pressure. The output of regulator 24 is fed to the inlet of a blower 26 driven by a blower motor 28 so that blower 26 supplies a fuel/air mixture to the burner 20 of the heater 12.

It is to be noted that the system generally described above essentially corresponds to that heating system described in U.S. Pat. No. 3,967,590, issued July 6, 1976, and assigned to the same assignee as the present application. It is further to be noted that the co-inventor of the aforesaid U.S. patent is the inventor of the present invention. The particular improvement of the present invention is best shown in FIGS. 2 and 3 of the present application and will be described in detail hereinafter.

Figure 2:
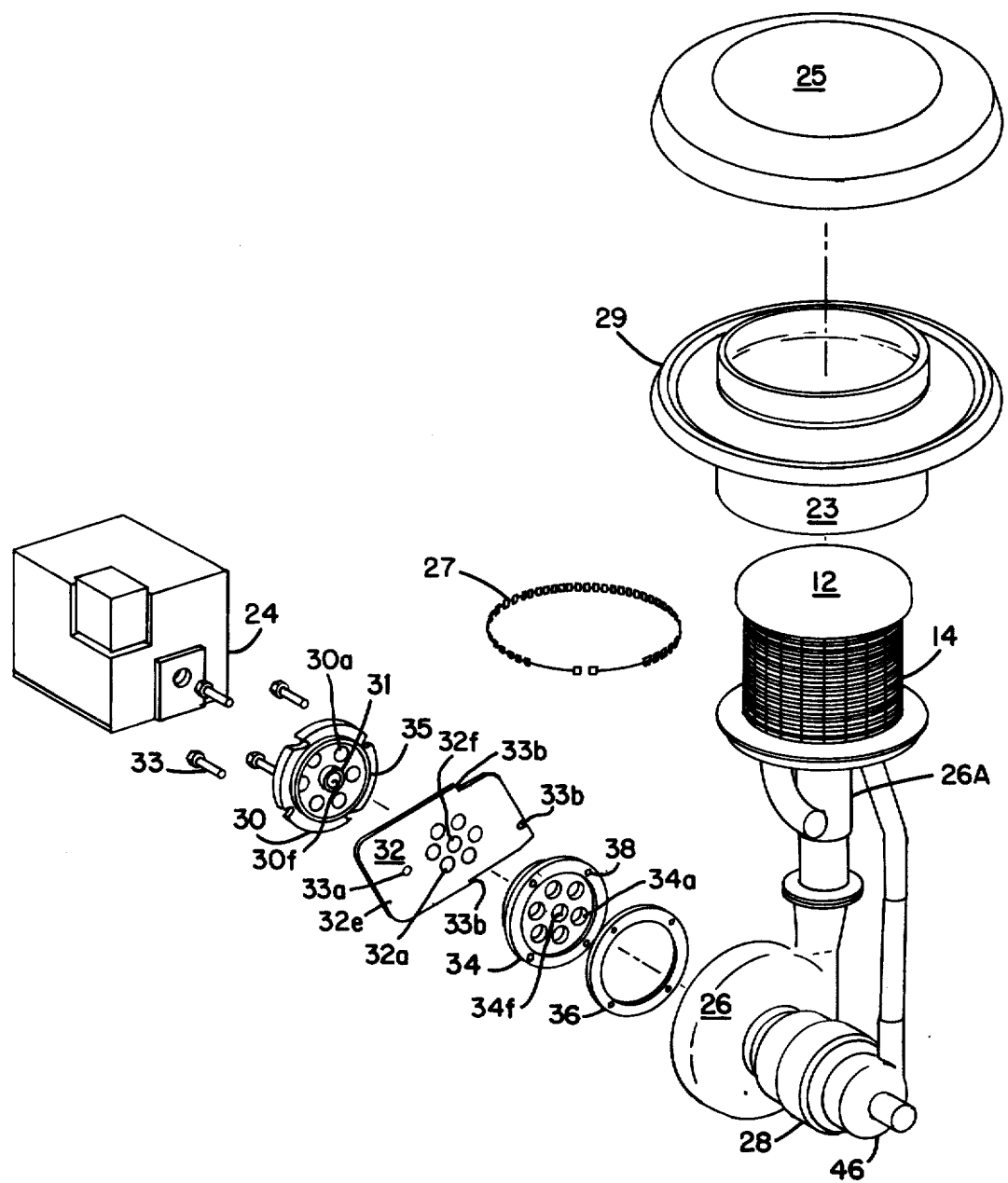
FIG. 2 is an exploded and elevated, perspective view of the heater unit of the heating system illustrated in FIG. 1.
Figure 3:
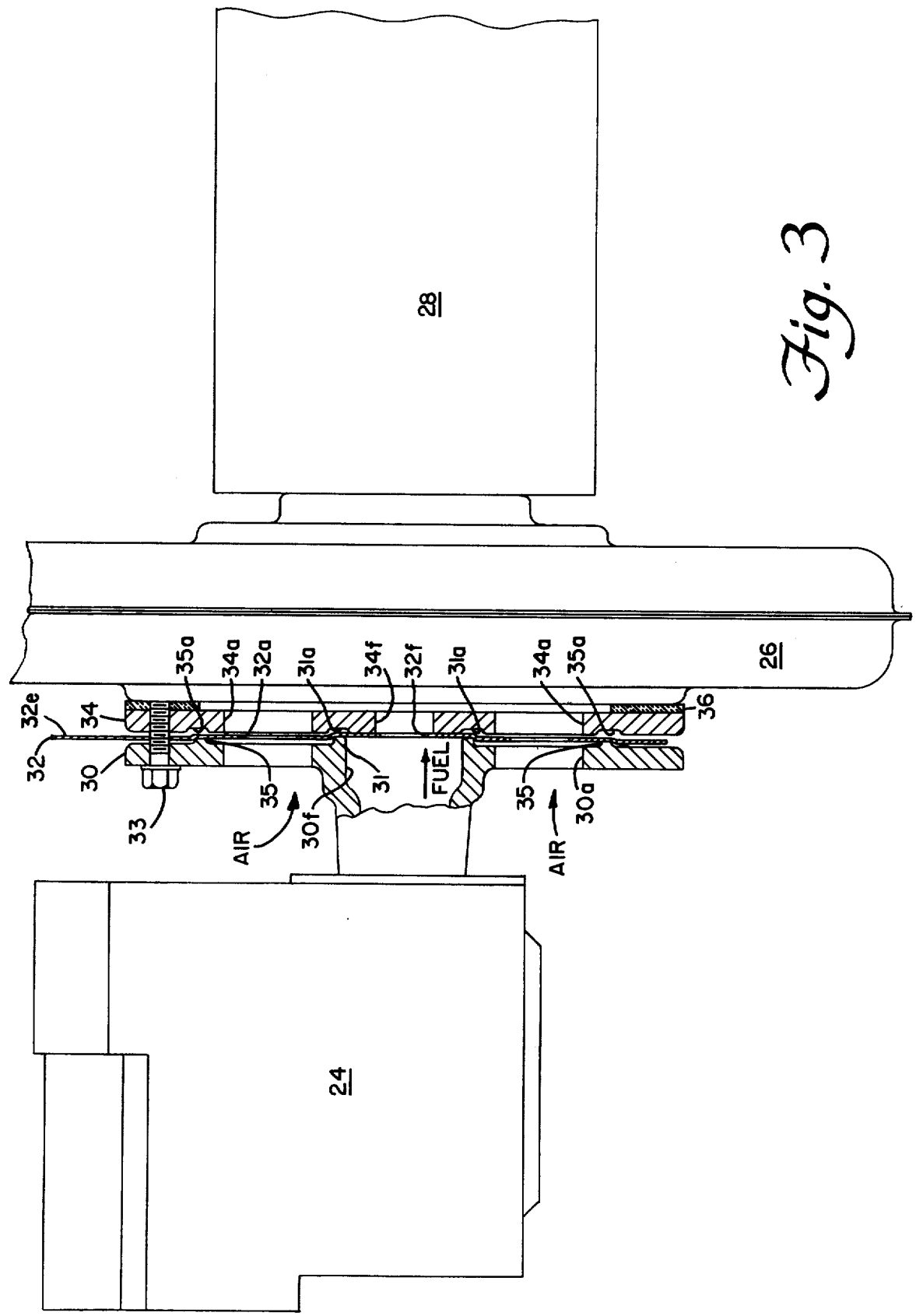
FIG. 3 is a cross-sectional view of the fuel and air mixing apparatus of the heater illustrated in FIG. 2.

As is best seen in FIGS. 2 and 3, the structure which meters fuel and air to the blower 26 comprises two structural plates 30 and 34 and an orifice plate 32. All three plates have center apertures 30f, 32f, and 34f, respectively which allow passage of fuel from the regulator 24 to the blower 26. Air apertures 30a, 32a, and 34a surround the center apertures in each of the plates. Operation of the blower 26 creates a sub-atmospheric pressure affect, thereby drawing fuel from the regulator 24 and air from the atmosphere. By varying the size and number of the air apertures 32a or the size of the fuel aperture 32f in the plate 32, the system can be adapted to different fuels, different fuel input rates and different fuel/air ratios.

The construction of orifice plate 32 allows rapid conversion of the heating system to different operating conditions as will be described hereinafter. The actual construction of the orifice place 32 typically involves stamping of the plate 32 from a relatively lightweight material such as SAE type 380 aluminum which is deformable under mechanical pressure. Plates 30 and 34, on the other hand, are formed from a harder material such as a relatively heavy-weight cast aluminum alloy.

The orifice place 32 is deformed to act as a sealing gasket when the plates 30 and 34 are tightened together by means of screws 33, thereby to prevent an uncontrolled amount of air from being drawn into the blower 26 from between the plates 30 and 32 or from between the plates 32 and 34. Since the orifice plate 32 itself acts as the sole sealing structure between the plates 30 and 34, no need exists for a separate sealing member. Accordingly, when a differently apertured orifice plate 32 replaces the orifice plate 32 already present in the system, it is not necessary to remove and replace additional sealing structure, a time consuming and relatively expensive previous consideration. As indicated above, the differently apertured orifice plates 32 are replaced on site in order to alter the heating capacity of the system or to convert the system to a different fuel. On installation of the orifice plate 32, tightening of the screws 33 causes the plate 32 to deform under pressure exerted on said plate 32 by the action of inner and outer annular ridges 31 and 35 formed on the place 30, the ridges 31 and 35 mating with inner and outer annular grooves 31a and 35a formed in the plate 34. The inner ridge 31 on the inner face of the plate 30 mates with the inner groove 31a on the inner face of the plate 34 to compress an annular portion of the orifice plate 32 into the groove 31a, thereby sealing the fuel conduit extending between the regulator 24 and the blower 26. The fuel apertures 30f, 32f, and 34f are thus sealed from ambient at the respective interfaces between the plates 30, 32, and 34 without the need for sealing structure additional to the orifice plate 32 itself. Similarly, the outer ridge 35 mates with the outer groove 35a radially outwardly of the air apertures 30a, 32a, and 34a to compress an annular portion of the orifice plate 32 into the groove 35a. That annular portion of the orifice plate 32 which is thus deformed between the ridge 35 and the groove 35a acts as the sole sealing structure necessary to respectively seal the plate 30 and 34 to the orifice plate 32 about the outer periphery of the structure. Uncontrolled quantities of air are thus prevented from entering the blower 26 from between plates 30 and 32 or from between the plates 32 and 34.

When it is necessary to remove the orifice plate 32, the screw 33 extending through full screw-receiving aperture 33a formed in the plate 32 is completely removed while the screws 33 extending through half apertures 32b are merely losened. As seen best in FIG. 2, the orifice plate 32 can then be grasped by the leftmost rectangular end portion 32e and pulled to the left as seen in the drawing to remove the plate 32 from between the plates 30 and 34. A new orifice plate 32 can then be inserted between the plates 30 and 34 using the exact reverse of the removal procedure, the half apertures 33b on the upper, lower, and right-most edges of the plate 32 mating with and abutting the loosened screws 33. The screw 33 which was removed is then inserted through the aperture 33a (and mating screw apertures in the plates 30 and 34) and all of the screws 33 then tightened to reassemble the structure. The new orifice plates 32 is thus deformed as aforesaid by the mating ridges 31, 35 and grooves 31a, 35a to seal the structure.

As can best be seen in FIG. 3, the end 32e of the orifice plate 32 extends outwardly of the plates 30 and 34 to allow the plate 32 to be readily grasped and removed as aforesaid. a further convenience afforded by the present structure is represented by the open screw apertures 30b formed on the plate 30, which apertures 30b mate with the apertures 32 and 32b respectively on the orifice plate 32 to receive the screws 33. One diametrically opposite pair of the apertures 30b are slanted to facilitate mounting of the plates, that is, the longitudinal axes of this pair of apertures lie along parallel chords of the circle defined by the outer perimeter of the plate 30 rather than along radii thereof. The plate 34 is seen to have mating screw apertures 34a which are completely circular, the apertures 34a mating with the screw apertures on the plates 30 and 32 to receive the screws 33 therethrough. A gasket 36 disposed between the outer face of the plate 34 and the blower 26 also has mating screw apertures formed therein which exactly correspond to the apertures 34a on the plate 34.

Referring again to FIG. 2, the orifice plate 32 is seen to have six of the air apertures 32a and a single fuel aperture 32f, the apertures being of the same size. It is to be understood that the air apertures 32a can be of a size different from the size of the fuel aperture 32f. In particular, the fuel aperture 32f can typically be of a smaller diameter than the diameter of the air aperture 32a. The fuel aperture 32f can also be a plurality of relatively smaller apertures rather than comprise a single aperture. Further, the orifice plate 32 can have fuel or air apertures 32a which would correspond to the aligned apertures 32a and 34a of the plates 30 and 34. In other words, the orifice plate 32 can be configured to block certain of the aligned apertures 30a and 34a of the plates 30 and 34 in order to reduce the quantity of the air which is metered into the system. The air apertures 32a in the orifice plate 32 can also be smaller in diameter than the apertures 30a and 34a in order to reduce the amount of air drawn through the plates and into the blower 26. Different orifice plates 32 are configured to have varying fuel/air mixing capabilities so that the entire heating system can have the heating capacity thereof rapidly altered of the metering characteristics changed in order to allow the use of a different fuel. As an example, natural gas has an input heating value of 80,000 BTU/hour. When natural gas is used in the heating system, the fuel aperture 32f in the orifice plate 32 may measure 0.221 inches in diameter and each of the air apertures 32a may measure 0.468 inches in diameter. Only three air apertures symmetrically disposed about the fuel aperture are typically needed when natural gas is used as the fuel. If the system is to be converted to use propane gas (having an input heating value of 170,000 BTU/hour), the fuel aperture 32f in the orifice plate 32 may measure 0.266 inches and each of the air apertures 32a may measure 0.500 inches in diameter. Further, when propane is used as the fuel, it is best to employ six air apertures symmetrically disposed about the fuel aperture as shown in FIG. 2. Conversion of the heating system from natural gas to propane only requires substitution of one orifice plate 32 for a differently configured orifice plate 32, which substitution can be rapidly carried out in the field. After this substitution, a simple matching of the blower speed to heating input requirements is all that is necessary to complete the conversion. As aforesaid, the substitution of the new orifice plate 32 for the used orifice plate is all that is necessary to also seal the plates 30 and 34 as aforesaid, no additional structure being necessary to form the seal.

A further description of the heating and cooling package 10 will now be given in order to fully describe the system within which the present orifice plate 32 functions as a gas metering and sealing device. As aforesaid, the structure hereinafter described substantially corresponds to that structure described and claimed in U.S. Pat. No. 3,967,590.

Referring again to FIGS. 1 and 2, a liquid heated by the heater 12 is circulated through a pipe 40 to a heat exchanger 42 at one end of package 10 and then through a return pipe 44 to a return pump 46 which forces the fluid back through the tube 16 in the heater 12. Pump 46 is operated by motor 28 which also drives blower 26. Therefore, if the motor 28 malfunctions, neither fuel for combustion nor heat exchange liquid is supplied to the heater 12. As a result, the possibility of the heater overheating because of combustion without the benefit of circulating liquid to carry away the heated combustion is greatly reduced.

As illustrated in FIG. 4, the fluid makes six passes through the heat exchanger matrix 14 by reason of the upper and lower ends of tube 16 communicating with upper and lower plenums having baffles which feed the input from pump 46 to the lower ends of a first group of four tubes 16, and the upper ends of said first group to the upper ends of a second group of said tubes 16 whose lower ends feed a third group and so on through six groups of tubes 16, with the last group feeding the heat exchanger 42 through pipe 40.

Referring now to FIG. 1 and FIG. 5, the upper end of heat exchanger coil 42 is also connected to an expansion tank 48 having a vent pipe which is closed by a rubber grommet 50 having a slit 52 therein to maintain the system substantially at atmospheric pressure while preventing any substantial loss by vaporization of the liquid. The liquid may be, for example, pure water with a corrosion inhibitor, or in the event the unit is to be mounted outside the area to be heated, a mixture of water and antifreeze such as ethylene glycol. Tank 48 is positioned in a region of the package 10 without substantial heat insulation so that any vapors of the liquid which are generated in the system will condense in the tank 48.

A blower 54, driven by a blower motor (not shown) mounted within the blower 54 is positioned in a space separated from the heater 12 by a wall 58 and blows air from said space through the heat exchanger 42. The input of blower 54 draws air from a cold air return duct 60 which is connected to the system 10 adjacent heat exchanger 42. A duct 62 is connected to the outlet at the end of the package 10 above the duct 60 and conducts air which has been drawn through heat exchanger 42 back into the home to heat the home. All of the walls of the compartment containing blower 54 may be insulated to reduce heat transfer across the compartment walls and to absorb noise generated by blower 54.

Expansion tank 48 is separated from heater 12 and blower 54. This arrangement makes it possible to maintain tank 48 at a lower temperature, as noted above, which aids in condensing any vapors produced in the heating system and entering tank 48. This compartmentalization has the further advantage of isolating controls 64 and heater 12 from the rest of the package and providing a more controlled environment for combustion. A cooling compressor 66 is provided on the opposite side of the wall from heater 12. It is of a conventional air conditioning type which compresses a refrigerant working fluid such as Freon and supplies it to a condenser 68 of a conventional type consisting of tubes and fins. Condenser 68 is positioned on the opposite end of the package 10 from the heating coil 42 and thus is exposed to the open air.

Liquid Freon from condenser coil 68 is piped via a conventional expansion valve or capillary tube (not shown) to a Freon expansion coil 70 which covers the end of the intake duct 60 and cools the air to blower 54 when the compressor 66 is operating. Coil 70 and heat exchanger 42 are mounted in the same chassis as shown in FIG. 1. The Freon from coil 70 is then returned to compressor 66 by a return pipe (not shown). Additional components such as filter driers are also preferably incorporated in the system in accordance with well-known practice.

The condenser coil 68 has air blown over it from inside the package 10 by means of a fan 72 driven by a motor 74. As illustrated herein, the fan 72 is mounted in a surrounding shroud 76 to improve fan efficiency.

Vents 73 on the sides of the package 10 in the region occupied by the compressor 66 provide an air intake for burner blower 26 and for fan 72. The wall between burner blower 26 and tank 48 is provided with openings 75 to allow air to pass from the region of compressor 66 to orifice plate 32 for intake by blower 26 without allowing snow, sleet, rain and the like from affecting the operation of components of the compartment containing the heater 12.

With the unit shown in FIG. 4 having total surface area of the interior of the tubes 16 on the order of one square foot, up to two hundred thousand BTU/hr. of energy produced by the burner 20 may be transferred to the fluid in tubes 16. For operation in the system disclosed, the burner 20 may be, for example, fired at 120,000 BTU/hr. and in excess of 80% of the input heat will be absorbed in the fluid.

Figure 6:
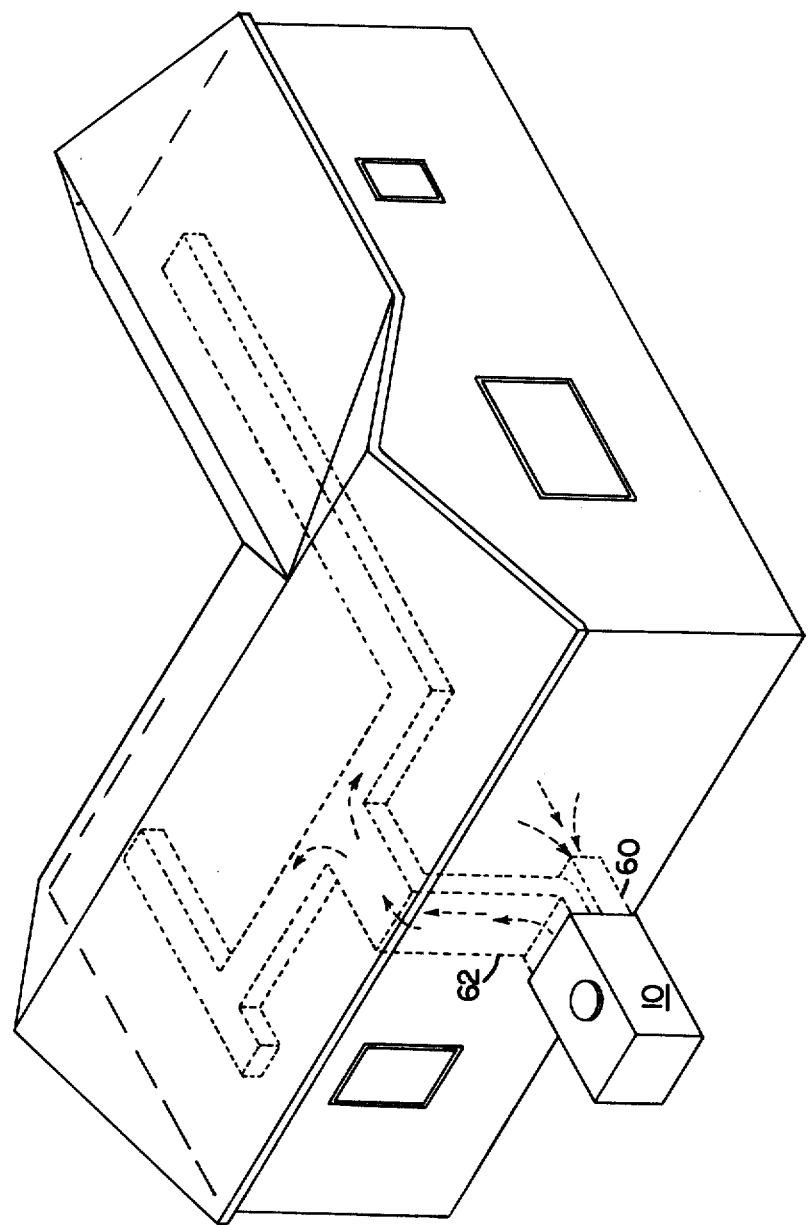
FIG. 6 illustrates an installation of the system of FIGS. 1 through 5 in a home.

Referring now to FIG. 6, there is shown an installation of a package unit 10 in a home having a gabled roof. The package 10 in on the back of the house and the ducts 60 and 62 are connected through the house and into the attic. As illustrated herein, the duct 62 supplies air to the various rooms of the house through a distribution duct work system blowing the air which has been heated or cooled into each room. The return air is collected by a return duct feeding the duct 60. Gas for the burner 20 may come from a utility supply or from a storage tank at the back of the house from which a pipe is fed to the package 10.

Figure 7:
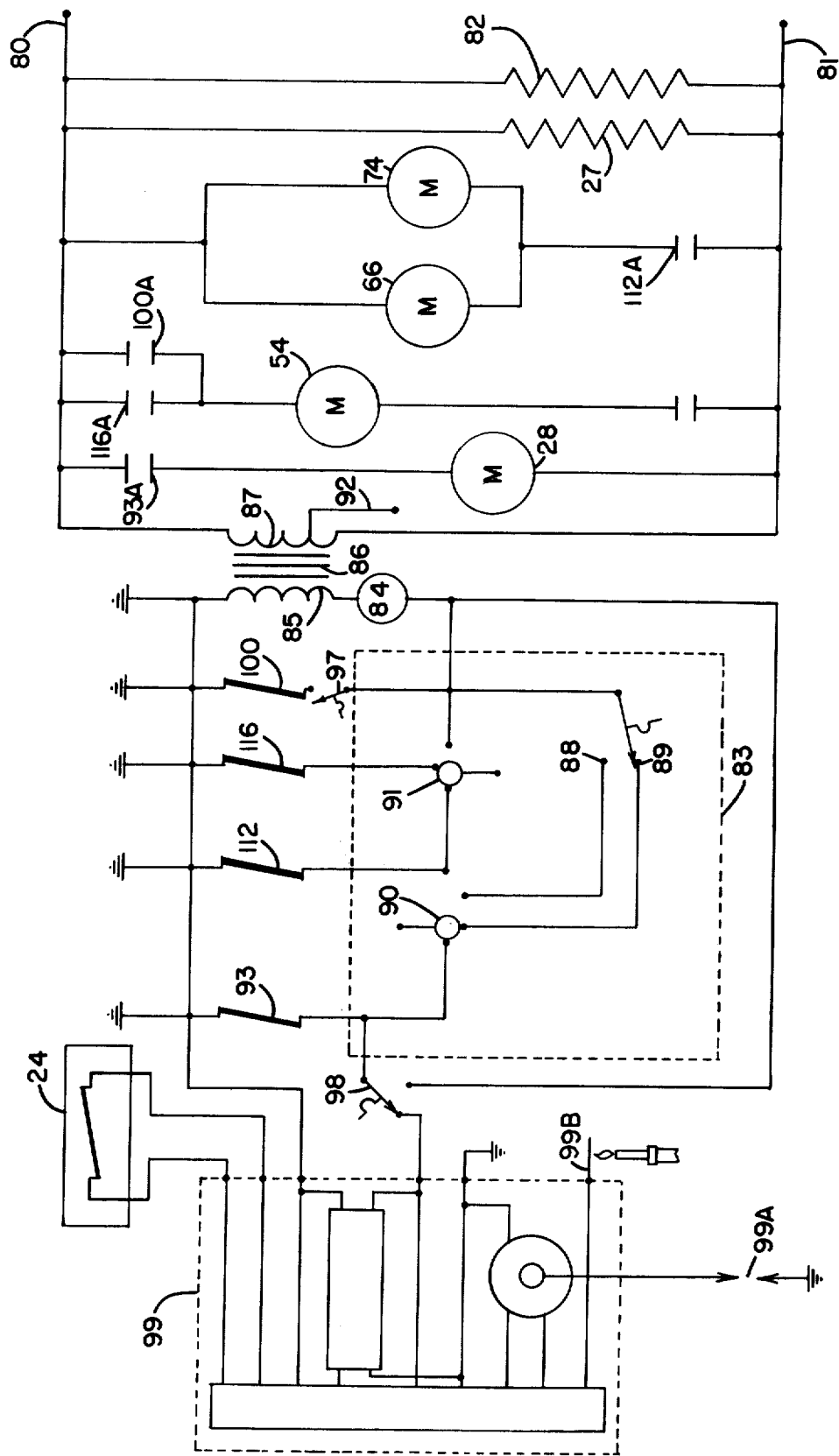
FIG. 7 is a schematic diagram of a control circuit for use with the system illustrated in FIGS. 1 through 5.

Referring now to FIG. 7, there is shown a control circuit for the package unit 10. Power line terminals 80 and 81 are each maintained at an AC voltage of, for example, 230 volts.

A crankcase heater 82, positioned in heat pump compressor 66 and energized from terminals 80 and 81, supplies sufficient heat to the compressor crankcase to maintain the crankcase oil substantially free of condensed refrigerant thereby preventing foaming of the oil upon starting the compressor which would decrease the oil's lubricating ability. Heater 82 may have a small value of 10 to 50 watts.

A module heater 27 is also connected directly to terminals 80 and 81 and may have a value of 10 to 50 watts for normal operating conditions of the unit. Module heater 27 is clamped around the lower plenum of the gas fired heating unit 12 as shown in FIG. 4, and maintains the fluid in tubes 16 of the heater at a temperature above the dew point at all times. As a result, substantially no deposits or condensate are produced on the heat exchanger.

While, if desired, the heater 27 may be deenergized during periods when the burner is actually firing, its power drain is very small. Hence, in the interests of reliability it is maintained continuously connected across the power bus. As a result, little or no condensate or other deposits form on the heat exchanger, and long, maintenance-free operation can be attained.

The temperature of the area being heated or cooled such as the home shown in FIG. 6 is monitored by a thermostat 83 located at any desired location in the house. Thermostat 83 may be two separate temperature responsive switches, one of which closes on temperature rise to activate the cooling system and one which closes on a drip in temperature to activate the heating system; or it may be one double-throw switch operated by a single temperature-sensitive element such as a bimetal or bellows to perform the same function. For simplicity of illustration, the latter construction is shown. Contact 88 controls the cooling mode and contact 89 controls the heating mode.

Thermostat 83 is in a low voltage circuit from transformer 86 whose primary winding 87 is connected to terminals 80 and 81 which may be at 230 volts, as noted above, and reduces the output of the secondary winding 85 to the "low" voltage which is customarily 24 volts nominal and always under 30 volts. A feature of the transformer is a tap 92 in the primary winding 87. If a lower line voltage such as 208 volts is used, it is connected instead of the connection shown, thus changing the ratio of turns between the primary and secondary windings, and giving the same low voltage output.

One end of the secondary winding 85 of the transformer 86 supplies power through the various switches described below to the operating controls, also described below. The other end of the secondary winding and one side of each of the controls in the low voltage circuit are connected to ground to establish electrical continuity.

Included in the thermostat 83 are two selector switches. Switch 90 is used to select the operating mode of the thermostat as either "off," "heat" or "cool." Switch 91 is used to select operation of the device as either "on" or "automatic."

Switch 90, as shown, is in the "heat" position and switch 91 is in the "automatic" position. With switch 90 in the "heat" position, contact 89 is connected to the common terminal fed by an auxiliary limit control 84 and the contact 88 is disconnected. Moved one position to the right, switch 90 would disconnect all thermostatic positions while moving two positions to the right would disconnect the heat contact 89 and connect the cooling thermostat contact 88. Switch 91 in the position shown provides automatic thermostatic control of the blower 54 whereas switch 91 moved one position to the right turns on blower 54 to run continuously.

With switch 90 and switch 91 in the positions shown and the temperature limit of thermostat 83 properly set, for example, for contact 89 to close when the ambient temperature falls below 68° F., the unit cycles automatically. Thus, when contact 89 closes, it energizes relay 93 closing relay 93a which supplies power to motor 28. Contact 89 also supplies power to a combustion control module 99 which energizes an ignition gap 99a, shown as the spark plug in FIG. 4, opens gas valve 24 and senses the presence of a flame with a flame sensor comprising flame rod 99b, also shown in FIG. 4. The ignition flame sensing and control circuitry of control module 99 are conventional, and any desired circuit may be used. The opposite side of module 99 from contact 89 is returned to ground.

When the fluid in heat exchanger 42 has reached a predetermined temperature, such as 120° F., fluid temperature sensing thermostat 97 closes to energize relay 100, thus closing contact 100A and thereby turning on blower 54 to circulate air in the heat exchanger 42, as shown in FIG. 1.

Thermostatic control 97 has a disc type temperature sensitive element and is sealed to resist moisture. It is inserted through a hole in the end plate of heat exchanger 42, shown in FIG. 1, and located in close proximity to the liquid carrying tubes. The temperature sensitive end is placed in contact with the first fin in the coil. It is clamped in this position to give good thermal contact with the fin. Control 97 is coated with a thermally conductive mastic to further help the heat transfer from the fin to the control. During the initial portion of a heating cycle, the hot liquid circulating through the tubes transfers heat to control 97 to start the blower. After the end of the heating cycle, the control becomes responsive to the temperature of the air cooling the fins, and it shuts off the blower after the heat is effectively removed from the coil but before the air becomes cool enough to create an uncomfortable condition in the enclosure being heated. Thus, thermostatic control 97 senses the temperature of the liquid during the initial portion of a heating cycle to activate the blower motor 54 but responds to the temperature of the circulating air after the burner shuts off. This gives a blower delay on start up so that cold air is not circulated and a delay at the end of the cycle to extract the heat remaining in the heat exchanger 42.

If switch 91 is shifted to the "on" position, relay 116 is energized closing relay contacts 116a in parallel with relay contact 100a to retain the blower motor energized continuously. Such operation is sometimes desirable to retain continuous circulation of air through a home.

If during operation the temperature of the fluid exceeds the temperature limit set for the limit switch 98, switch 98 moves from the position shown to a second position, thereby shutting off the supply of fuel to the burner while maintaining power to motor 28. The temperatures selected for opening of switch 98 may be, for example, somewhat below the boiling point of the fluid. For example, if the fluid in tubes 16 is water, a temperature of approximately 200° F. may be chosen for the opening of the limit switch 98.

Thus, the operation of the limit switch 98 in the low voltage circuit performs a double function. As a temperature sensitive bulb, it is immersed in the circulating liquid in one of the tubes as shown in FIG. 4. When the burner is firing, and if the liquid temperature becomes excessive to approach the boiling point, the normally closed contacts in switch 98 closes to keep the combustion blower-pump motor 28 energized whether the thermostat contact 89 is closed or not. This quickly lowers the temperature of the liquid safely below the boiling point at which time the limit control moves to the position shown in FIG. 7.

Often, at the end of a heating cycle when contact 89 opens, thereby disabling pump 46, there is sufficient residual heat remaining in the heater 12 to raise the liquid temperature of the fluid remaining in the heater 12 to the boiling point. Before the temperature reaches this level, the limit switch 98 functions to close the normally open contact to complete the additional circuit from the transformer to relay 93 and thus restart the combustion blower-pump motor 28 to circulate the liquid and thus lower its temperature at which time switch 98 returns to its normal position.

The auxiliary limit control 84 is a manual reset device with a temperature sensitive disc as shown in FIG. 4. When it opens, all low voltage power is interrupted making the unit inoperative until manually reset as shown in FIG. 7. This control functions when there is an absence of liquid in the heater 12 to remove the heat of combustion, by sensing the temperature of the base of the heater directly. The primary limit control 98, on the other hand, is immersed in the liquid in a tube 16; it is in intimate contact with the medium being monitored. If the tube is devoid of liquid, however, the operation of control 98 is slow since the bulb must be heated by air rather than by liquid. Also, due to circuitry, control 98 recycles indefinitely, allowing the combustion system to continually repeat its operation. This is undesirable when the heater 12 does not contain liquid as a result of a leak or other malfunction.

When it is desired to operate the package as a cooling system, the switch 90 is placed in the cooling position, and under these conditions when the temperature rises above a predetermined value, the switch 88 closes energizing a compressor relay coil 112. In the event that switch 91 is in the automatic position, it also energizes relay coil 116. Relay coil 112 closes contacts 112A and energizes compressor motor 66 and fan motor 74. When energized, the fan motor 74 cools the condenser coil 68 to cool the compressor refrigerant being pumped thereto by the compressor 66 as shown in FIG. 5.

There is thus disclosed a package heat exchange system having a burner positioned in the central plenum of a substantially cylindrical heat exchanger. Numerous modifications will be evident to those skilled in the art. The foregoing description of a preferred embodiment is, therefore, intended to be interpreted broadly.

What is claimed is:

1. A heating system comprising a burner for burning a fuel/air mixture, the fuel being supplied by a fuel regulator to a blower which directs the fuel and air mixed therewith to the burner for combustion, the improvement comprising a gas metering means disposed in a gas conduit between the fuel regulator and the blower for metering predetermined quantities of fuel and air into the blower, the gas metering means comprising:

first and second structural plate members having at least one fuel aperture respectively formed in each of said plate members, the fuel apertures communicating the fuel regulator with the blower, each plate member further having at least one air aperture formed therein to communicate the blower with a source of combustion air, the first plate member having the air aperture formed therein exposed to the source of combustion air;

an orifice plate disposed between the first and second plate members and having at least one fuel aperture and at least one air aperture formed therein, the apertures communicating with the respective fuel and air apertures of the plate members to allow flow of fuel and air through the plate members and through the orifice plate to the blower, the orifice plate acting to form a seal with and between the plate members, said orifice plate being the only sealing structure present between the plate members; and, means for holding the plate members and the orifice plate together to facilitate formation of the seal provided by the orifice plate and to allow the orifice plate to be rapidly removed and replaced on site by another orifice plate for maintenance purposes or for altering the heating capacity of the system or for converting the system to the use of an alternate fuel.

2. In the structure of claim 1, the improvement further comprising raised ridges formed on an inner face of one of the plate members and mating recessed grooves formed on an inner face of the other of the plate members, the ridges and grooves mating on assembly of the gas metering means by the holding means to deform portions of the orifice plate into the grooves, thereby causing the orifice plate to comprise the sole sealing structure between the plate members and said orifice plate.

3. In the structure of claim 1, the improvement further comprising an elongated portion of the orifice plate disposed on one end thereof and extending beyond the outer perimeters of the plate members, thereby to allow the orifice plate to be readily grasped and removed from between the plate members.

4. In the structure of claim 1 wherein the holding means comprise a plurality of aligned screw-receiving apertures formed respectively in the plate members and in the orifice plate, and, screws adapted to be received within the screw-receiving apertures to hold the plate members and orifice plate together, only one of the screw receiving apertures formed in the orifice plate being completely bordered by the material of which the orifice plate is formed, the remaining screw-receiving apertures being discontinuous about at least portions of the apertures to allow sliding of the orifice plate from between the plate members on complete removal of only the one screw disposed in the one complete aperture and the mere loosening of the remaining screws, the orifice plate being thereby rapidly removable from between the plate members and another orifice plate being rapidly insertable between said plate members for assembly therebetween.

5. In the structure of claim 1 wherein the air apertures formed in the orifice plate differ in number from the air apertures formed in the plate members.

6. In the structure of claim 1 wherein the fuel and air apertures formed in the orifice plate differ in number from the corresponding apertures formed in the plate members.

7. In the structure of claim 1 wherein the fuel and air apertures formed in the orifice plate differ in size from the corresponding apertures formed in the plate members.

8. In the structure of claim 1 wherein the fuel aperture in the orifice plate has a diameter in the range of 0.2 inch to 0.4 inch and the air apertures in the orifice plate have a diameter in the range of 0.4 inch to 0.6 inch.

9. A heat exchange system for heating air within an enclosure, comprising:

a first heat exchanger;

a second heat exchanger located a distance from the first heat exchanger and disposed such that air from the enclosure can be moved through the second heat exchanger and returned to the enclosure;

a burner positioned in the first heat exchanger for supplying heat to the first heat exchanger;

means for circulating a fluid from the first heat exchanger to the second heat exchanger and back to the first heat exchanger;

means for supplying fuel to the system and terminating in a first plate member;

means for directing a fuel/air mixture to the burner for combustion, said means having a second plate member disposed upstream thereof and facing the first plate member, said first and second plate members having fuel and air apertures formed therein; and, a planar sealing member having a first aperture aligned with the fuel apertures formed in the plate members for permitting fuel to move from the supply means to the burner and a second aperture aligned with the air apertures formed in the plate members for permitting air to enter the mixture directing means and to mix with the fuel as the fuel moves to the burner, the planar member being disposed between the plate members and acting to meter and to allow mixing of air and fuel, the planar member being mechanically deformable by the plate members to form a seal between said plate members, the planar member being the only seal between the plate members, the planar member further functioning to allow flow of predetermined quantities of air and fuel to the burner.

10. The structure of claim 9 and further comprising means for allowing rapid replacement of the planar sealing member, the replacement means comprising a plurality of aligned screw-receiving apertures formed respectively in the plate members and in the planar member and screws adapted to be received within the screw-receiving apertures to hold the plate members and the planar member together, only one of the screw-receiving apertures formed in the planar member being completely bordered by the material of which the planar member is formed, the remaining screw-receiving apertures being discontinuous about at least portions of the apertures to allow sliding of the planar member from between the plate members on complete removal of only the one screw disposed in the one complete aperture and the mere loosening of the remaining screws, the planar member being thereby rapidly removable from between the plate members and another planar member being rapidly insertable between said plate members for assembly therebetween.

* * * * *